(12) United States Patent
Perkins

(10) Patent No.: US 11,846,613 B2
(45) Date of Patent: Dec. 19, 2023

(54) STRAIN TESTING RIG AND METHOD OF EVALUATING STRAIN CHARACTERISTICS OF SPECIMEN

(71) Applicant: Bayou Holdco, Inc., Houston, TX (US)

(72) Inventor: Randall Perkins, Houston, TX (US)

(73) Assignee: Bayou HoldCo, Inc., Saint Louis, MO (US)

( * ) Notice: Subject to any disclaimer, the term of this patent is extended or adjusted under 35 U.S.C. 154(b) by 343 days.

(21) Appl. No.: 17/139,296

(22) Filed: Dec. 31, 2020

(65) Prior Publication Data
US 2022/0205889 A1    Jun. 30, 2022

(51) Int. Cl.
*G01N 3/20* (2006.01)
*G01N 3/08* (2006.01)

(52) U.S. Cl.
CPC ............ *G01N 3/20* (2013.01); *G01N 3/08* (2013.01); *G01N 2203/0026* (2013.01)

(58) Field of Classification Search
CPC ..... G01N 3/20; G01N 3/08; G01N 2203/0026
USPC .......................................................... 73/789
See application file for complete search history.

(56) References Cited

U.S. PATENT DOCUMENTS

| | | | | |
|---|---|---|---|---|
| 3,196,672 A | * | 7/1965 | Keller .................. | G01N 3/20 73/812 |
| 3,693,424 A | * | 9/1972 | Wagle .................. | G01N 3/08 73/832 |
| 5,231,882 A | * | 8/1993 | Bertele ................ | G01N 3/20 73/852 |
| 5,907,394 A | * | 5/1999 | Ghorashi ........... | G01N 33/362 356/73.1 |
| 8,082,802 B1 | * | 12/2011 | Sadegh ............... | G01N 3/08 73/856 |
| 10,316,993 B2 | | 6/2019 | Mueller et al. | |

(Continued)

FOREIGN PATENT DOCUMENTS

| | | |
|---|---|---|
| CN | 203858162 U | 10/2014 |
| CN | 205192869 U | 4/2016 |

(Continued)

OTHER PUBLICATIONS

Testresources, Flexure Test of Insulation Materials, www.linkedin.com/company/testreseources, Jun. 30, 2020, 7 pages.

(Continued)

*Primary Examiner* — Nathaniel T Woodward
(74) *Attorney, Agent, or Firm* — STINSON LLP

(57) ABSTRACT

A strain testing rig for testing an elongate specimen has at least three restraints arranged to be spaced apart along the elongate specimen. Each restraint engages the elongate specimen at a respective contact location such that the strain testing rig defines an independent strain zone between each pair of adjacent contact locations. A drive mechanism moves the at least three restraints to stretch each independent strain zone such that the length of each independent strain zone increases independent of strain in the other zones. The restraints can be pivotably connected end-to-end as a chain linkage. The drive mechanism drives the chain linkage from a first position in which a forward facing side of the chain linkage which opposes the specimen is substantially straight to a second position in which the forward facing side of the chain linkage is convexly curved.

25 Claims, 7 Drawing Sheets

(56) References Cited

U.S. PATENT DOCUMENTS

| | | | | |
|---|---|---|---|---|
| 2015/0268144 | A1* | 9/2015 | Clark | G01M 5/0075 |
| | | | | 73/849 |
| 2020/0271433 | A1* | 8/2020 | Brossier | G01B 21/32 |
| 2022/0205889 | A1* | 6/2022 | Perkins | G01N 3/08 |

FOREIGN PATENT DOCUMENTS

| | | |
|---|---|---|
| CN | 104502089 B | 2/2017 |
| CN | 106113474 A | 1/2018 |
| CN | 207197911 U | 4/2018 |
| CN | 106500900 B | 11/2018 |
| CN | 109848329 A | 6/2019 |
| CN | 208936940 U | 6/2019 |
| CN | 106840913 B | 8/2019 |
| CN | 107610926 B | 10/2019 |
| CN | 110961497 A | 4/2020 |

OTHER PUBLICATIONS

Meiwes, Cristoph et al., Full-Scale Reeling Tests of HFI Welded Line Pipe for Offshore Reel-Laying Insulation, Proceedings of the 2014 10th International Pipe Conference, Oct. 3, 2014, 7 pages.

\* cited by examiner

STRAIN TESTING RIG AND METHOD OF EVALUATING STRAIN CHARACTERISTICS OF SPECIMEN

FIELD

This disclosure generally pertains to a strain testing rig and methods of evaluating strain characteristics of a specimen using such a rig.

BACKGROUND

Metal pipes are often insulated to promote the efficient transport of hydrocarbons through the pipes in harsh environments. For example, temperatures on the ocean floor at significant depths are very cold. The loss of heat from the pipe to the ocean water can cause the oil (or other hydrocarbon) to deposit hydrates, waxes, and asphaltenes within the pipe. These can lead to reduced flow and even plugging of the pipe. It is known to insulate pipes in an injection molding process prior to deployment. Injection molded insulated pipes can be used, for example, in subsea oil and gas pipelines or risers. On the other hand, some extracted hydrocarbons can be at u7 extremely high temperatures which are deleterious to the insulation material. Some subsea oil and gas environments require pipes that can withstand temperatures of 350° F. or more.

There is a recognized a need to increase the maximum operating temperatures of insulated pipes used in subsea oil and gas pipelines or risers. To that end, industry is developing new high-temperature polymers that can be used in molding systems of the type disclosed in U.S. Patent Application Publication No. 2017/0355114 (hereby incorporated by reference in its entirety) to form high temperature insulation on pipes. However, for a new high-temperature polymer to be successfully deployed, it must meet not only the temperature requirements of a given application, but also the often strenuous mechanical requirements. For instance, offshore pipes are usually "reeled," which is the process by which pipes are wound around very large, ship-bound spools in a way similar to winding a thread onto a sewing spool. The reeling process imparts significant tension and bending stress on insulated pipes, and it is important for a purchaser of such pipes to have confidence that the insulation material can withstand the reeling operation without material failure.

In the past, four-point bend testing rigs have been used to test coated pipes to evaluate their suitability for reeling. Such bend testing rigs are configured to push the middle portion of an insulated pipe supported at its ends in a direction normal to the pipe axis. This causes the pipe to bend. The industry once believed that this bending simulates the bending that occurs as straight insulated pipe is wound onto a large round reel. But over time, the industry began to notice that materials adjudged to be suitable for reeling based on four-point bend tests would too frequently fail when reeled in a field application. It was determined that the four-point bending tests do not adequately test suitability for reeling because they do not stretch the sample in tension as occurs with pipes used in reeling applications.

Accordingly, a different "full scale reel-test rig" has been developed for assessing reeling suitability and has been widely adopted by the industry. In this test rig, a first end portion of a full-scale insulated pipe is secured in a clamp so that the remainder of the insulated pipe is cantilevered from the first end portion. A drive mechanism is then coupled to the opposite second end portion of the insulated pipe. The drive mechanism is specially designed to simultaneously bend and stretch the insulated pipe in axial tension. These types of full-scale field tests have proven to be more predictive than the four-point bending tests used in the past.

SUMMARY

In one aspect, a strain testing rig for testing an elongate specimen having a first end portion and a second end portion spaced apart along an axis comprises at least three restraints arranged to be spaced apart along the axis of the elongate specimen. Each of the restraints is configured to engage the elongate specimen at a respective contact location such that the strain testing rig defines an independent strain zone between each pair of adjacent contact locations. Each independent strain zone has a length along the axis. A drive mechanism is configured to move the at least three restraints to stretch each independent strain zone such that the length of each independent strain zone along the axis increases.

In another aspect, a method of strain testing an elongate specimen comprises engaging a plurality of restraints with the elongate specimen at respective contact locations spaced apart along a length of the elongate specimen. Each of the plurality of restraints is moved to simultaneously increase a length of at least two independent strain zones. Each independent strain zone is located between an adjacent pair of contact locations.

In another aspect, a strain testing rig for testing an elongate specimen having a first end portion and a second end portion spaced apart along an axis comprises a base. A chain linkage is supported on the base. The chain linkage comprises a plurality of chain link restraints pivotably connected end-to-end. The chain linkage has a first end portion, a second end portion, and a length extending from the first end portion to the second end portion. The chain linkage has a longitudinal forward facing side configured to oppose the elongate specimen such that, on the longitudinal forward facing side of the chain linkage, each chain link restraint engages the specimen at a respective location along the axis. A driver is connected to the chain linkage for driving the chain linkage through a range of motion with respect to the base. The range of motion includes a first position in which the forward facing side of the chain linkage is substantially straight and a second position in which the forward facing side of the chain linkage is convexly curved.

Other aspects and features will be understood hereinafter.

BRIEF DESCRIPTION OF THE DRAWINGS

Corresponding reference characters indicate corresponding parts throughout the drawings.

DETAILED DESCRIPTION

Figure 1:
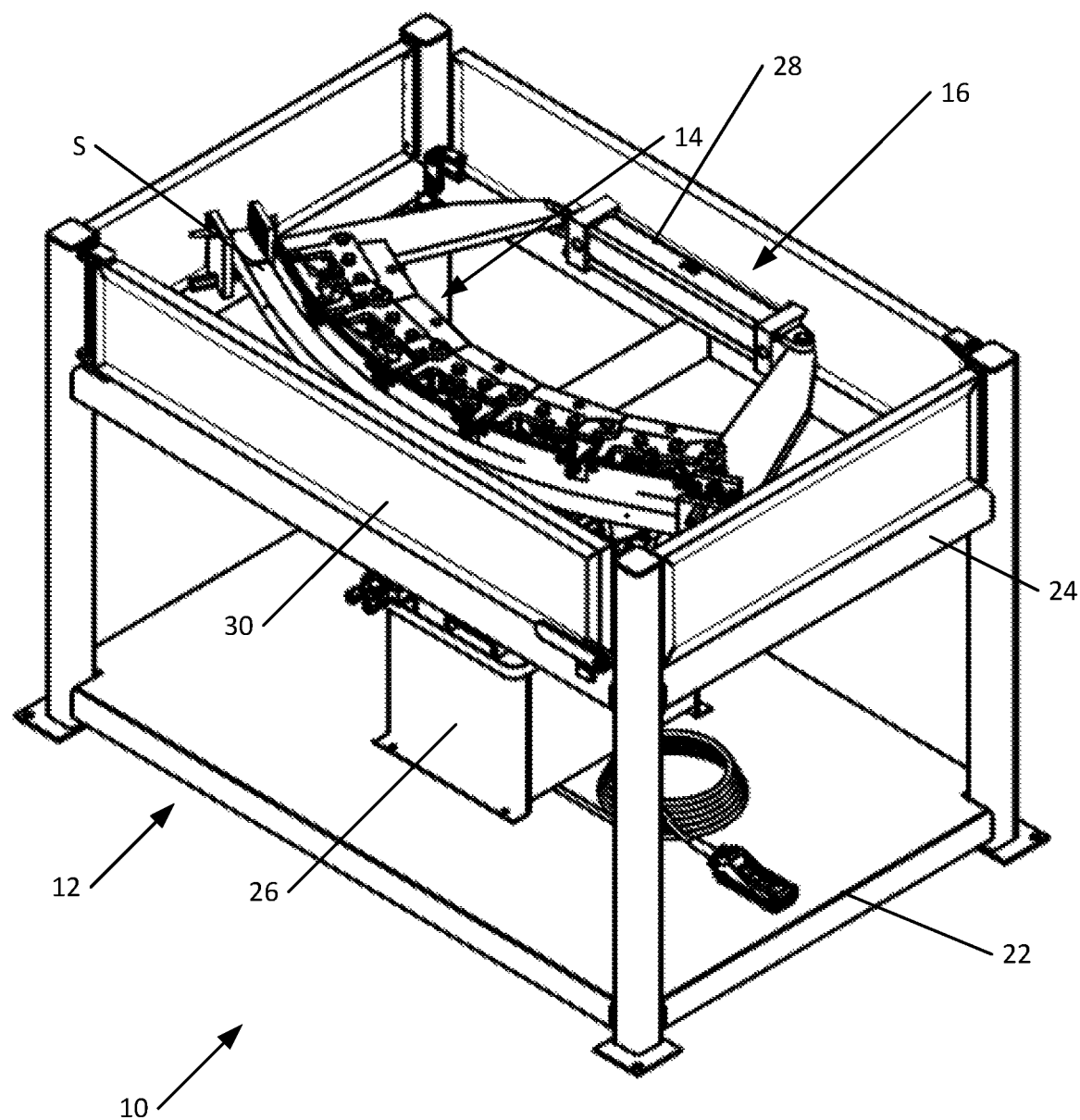
FIG. 1 is a perspective of a strain testing rig in the scope of this disclosure, illustrating the strain testing rig in a position at which it deforms a specimen.

The inventors have recognized a need in the industry for a laboratory-scale test rig that can provide a useful indication of the suitability of a given material for reeling operations based on a relatively small specimen. The full-scale reel-test rig described above, while capable of providing a useful indication of suitability for reeling, requires a full-length insulated pipe to operate. In other words, a developer of materials must undertake the expense of forming a full-scale insulated pipe from the material of interest before it can make a reasonable assessment of the suitability of the material for reeling. This creates a substantial impediment to material development. The inventors have recognized that materials could be developed more efficiently it were possible to test a small-scale sample of material of interest without applying it to a pipe.

Current laboratory-scale testing solutions include conventional tensile test and three- and four-point bend test devices. The industry has attempted to assess the suitability of materials for reeling by testing small specimens on these types of conventional laboratory devices. However, the inventors have recognized that the results provided by existing laboratory devices do not provide a reliable indication of suitability for reeling. For example, materials that exhibit sufficient elongation at break when tested at lab scale will unexpectedly fail in the field. The inventors hypothesize that laboratory tests fail because they are designed to isolate stress to a small, well-defined area. The isolated strain effects do not scale to the very much larger applications of the material in the field. In field applications, weak points in the material are very likely to be present, but such weak points do not often manifest in current small-scale lab specimens. But during reeling, once this higher rate of strain begins to occur in a weaker region of the material, all yielding will take place in this weakened region. In effect, the properties of the material will be dictated by the weakest portion of the material, which is not subject to testing under current laboratory conditions.

Another complicating factor is that, in an insulated pipe, the relative straining of the insulation material is constrained by adherence to the underlying steel pipe. Localized variances in strain rates due to inconsistent material physical properties (ex: Porosity, poor mixing, curing variances) is limited by regional constraint. However, the pipe itself is prone to inconsistent strain rates due to variances in pipe wall thickness, metallurgical inconsistencies, and geometrical variances. The much stronger pipe distortions will dictate distortions in the insulation.

In view of all this, the inventors have concluded that useful laboratory-scale testing of materials for suitability for reeling requires an apparatus that can simulate and contain localized distortions that occur as a larger material specimen is stressed. As explained more fully below, this disclosure provides a strain testing rig that is configured to stretch elongate specimens, e.g., specimens of about 1 foot to about 8 feet in length (e.g., from about 3 feet (0.91 m) to about 4 feet (1.22 m) and having a cross-sectional area from about 2 $in^2$ (13 $cm^2$) to about 36 $in^2$ (232 $cm^2$) (e.g., from about 8 $in^2$ (51 $cm^2$) to about 20 $in^2$ (52 $cm^2$)). Further the strain testing rig is designed to mimic the way in which the steel pipe constrains the strain rate of the insulation material along the length of the pipe. More particularly, the strain rig discussed below is configured to constrain the elongate specimen to force the strain to occur somewhat evenly within discrete longitudinal zones along the length of the specimen, similar to the role of the pipe adhered to the insulation.

Referring to FIGS. 1-4, a strain testing rig for testing the strain characteristics of an elongate specimen S is generally indicated at reference number 10. The strain testing rig generally includes a base 12, a chain linkage 14 (broadly, a linkage) supported on the base for movement relative to the base through a range of motion, and a drive mechanism 16 connected to the linkage for driving the linkage through its range of motion. The chain linkage 14 is generally configured to engage the elongate specimen S so that the linkage deforms the specimen as the drive mechanism 16 drives the linkage through the range of motion. The illustrated linkage 14 comprises five links 20 that are pivotably connected end-to-end as a chain, although other numbers of links could be used. Each chain link 20 broadly forms a restraint that is configured to engage the specimen S at a respective contact location along the axis A. In the illustrated embodiment, the strain testing rig 10 is configured to test specimens S having a minimum length of 3 feet (0.91 m) and cross-sectional dimensions of up to 3 inches-by-3 inches (8 cm by 8 cm). It will be understood however, that strain testing rigs could be configured to test specimens of other sizes without departing from the scope of the disclosure.

As explained more fully below, each chain link restraint 20 is configured to constrain a restrained portion RP of the specimen S at the respective line of contact (broadly, "contact location") such that the restrained portion moves conjointly with the restraint as the chain linkage 14 moves along its range of motion. This enables the strain testing rig 10 to define independent strain zones SZ along the specimen S, each having a length along the axis A between each pair of adjacent restrained portions RP. As explained more fully below, as the drive mechanism 16 drives the linkage 14 through its range of motion from a first position (FIGS. 2 and 3) to a second position (FIGS. 1 and 4), the drive mechanism moves the restraints 20 to stretch each of the independent strain zones SZ such that a length of each independent strain zone along the axis A increases. By constraining the longitudinally spaced restrained portions RP to the individual chain link restraints 20, the strain testing rig 10 can isolate the independent strain zones SZ so that the strain on each zone is largely independent of the strain on the remainder of the specimen. The inventors believe that this provides much more robust information about the strain characteristics of the specimen than conventional laboratory-scale strain testing methods in which a much smaller specimen is strained as one unit. Furthermore, the inventors believe that the strain information provided by the strain testing rig 10 can provide a much more reliable indication of the suitability of a material for reeling.

Further details about the structure of the illustrated strain testing rig 10 are provided below. However, it is contemplated that a strain testing rig can differ from the illustrated embodiment without departing from the scope and principles of the disclosure. Generally, strain testing rigs in the scope of this disclosure can have (i) at least three movable restraints for engaging an elongate specimen at respective lines of contact spaced apart along the longitudinal axis of the specimen and (ii) a drive mechanism configured to move the restraints in such a way as to stretch independent strain zones of the specimen extending along the longitudinal axis between the lines of contact so that the length of each independent strain zone increases. Although the illustrated embodiment uses a particular drive mechanism 16 (discussed below) and chain linkage 14 to force independent strain zones SZ to stretch at least somewhat independently, it is contemplated that other embodiments can provide other linkages and mechanisms for performing this function within the scope of this disclosure.

Referring to FIG. 1, in the illustrated embodiment, the base 12 comprises a lower platform 22 and an upper platform 24. The lower platform 22 supports a hydraulic system 26, and the upper platform 24 supports an assembly including the linkage 14 and the drive mechanism 16. In the illustrated embodiment, the upper platform 24 is configured to attach to the centermost chain link restraint 20 such that centermost chain link restraint 20 is fixed in place with respect to the base 12 and the remainder of the linkage 14 and the drive mechanism 16 is freely suspended from the centermost chain link restraint. The illustrated drive mechanism 16 comprise a hydraulic cylinder 28 (broadly, a linear actuator) that is powered by the hydraulic system 26. A safety fence 30 is positioned on the upper platform around the linkage 14 and the drive mechanism 16. Suitably, at least one portion of the safety fence 30 is selectively openable as a gate to allow a specimen S to be loaded onto, and unloaded from, the testing rig 10.

Figure 2:
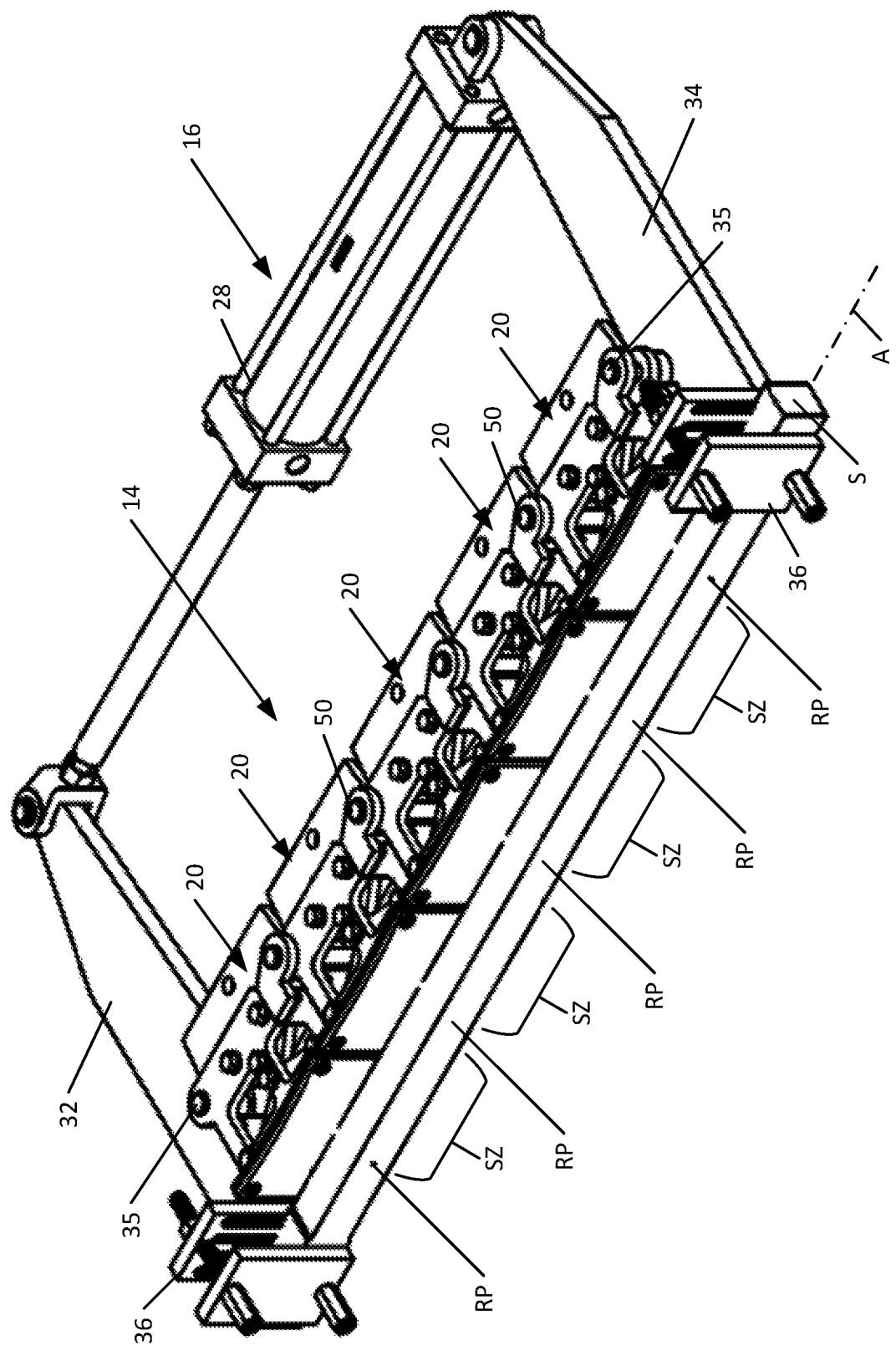
FIG. 2 is a perspective of a subassembly of the strain testing rig including a drive mechanism and a chain linkage, illustrating the subassembly in a position at which it holds the specimen without deforming the specimen.
Figure 3:
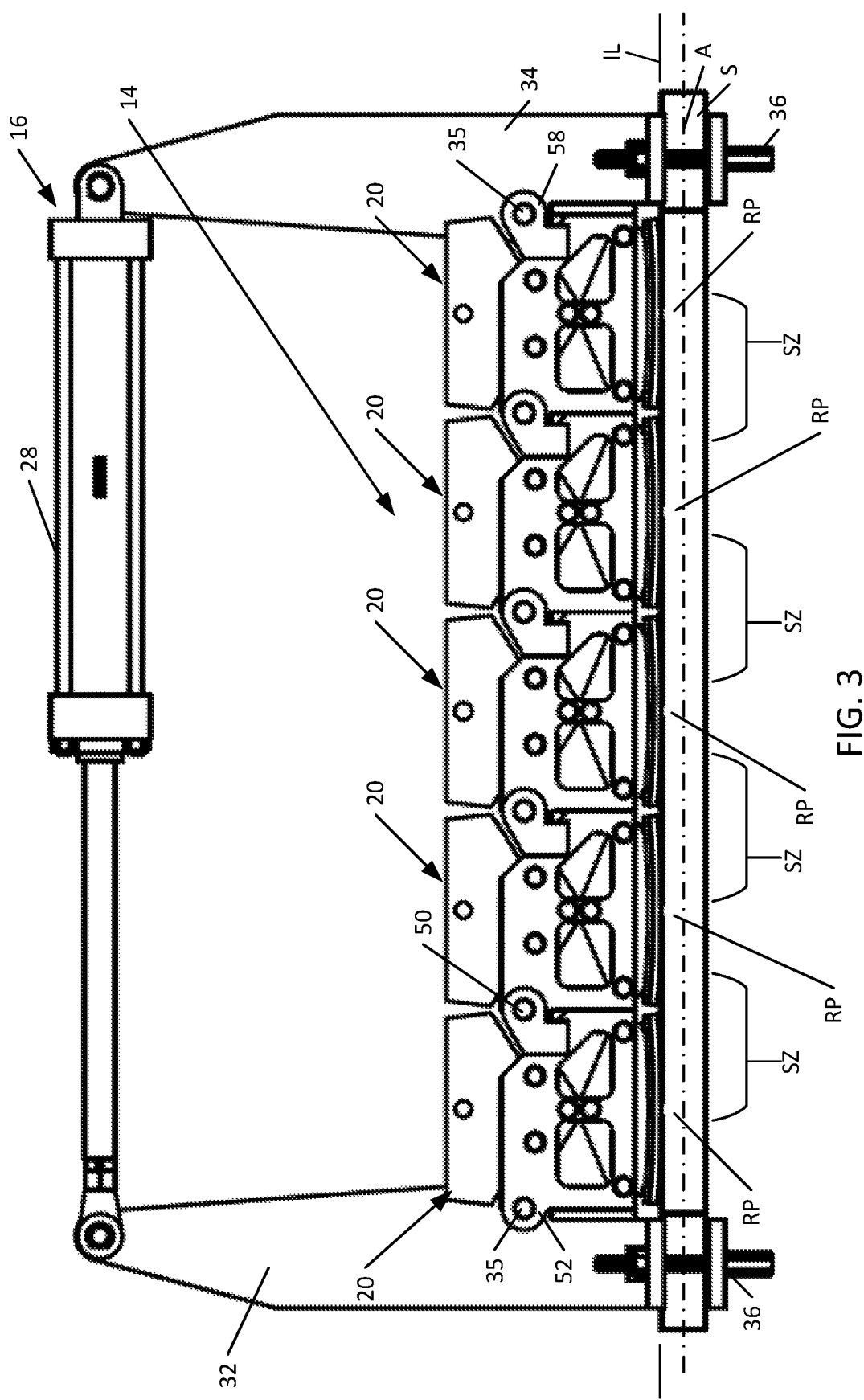
FIG. 3 is a top plan view of the subassembly of FIG. 2 in the position of FIG. 2.
Figure 4:
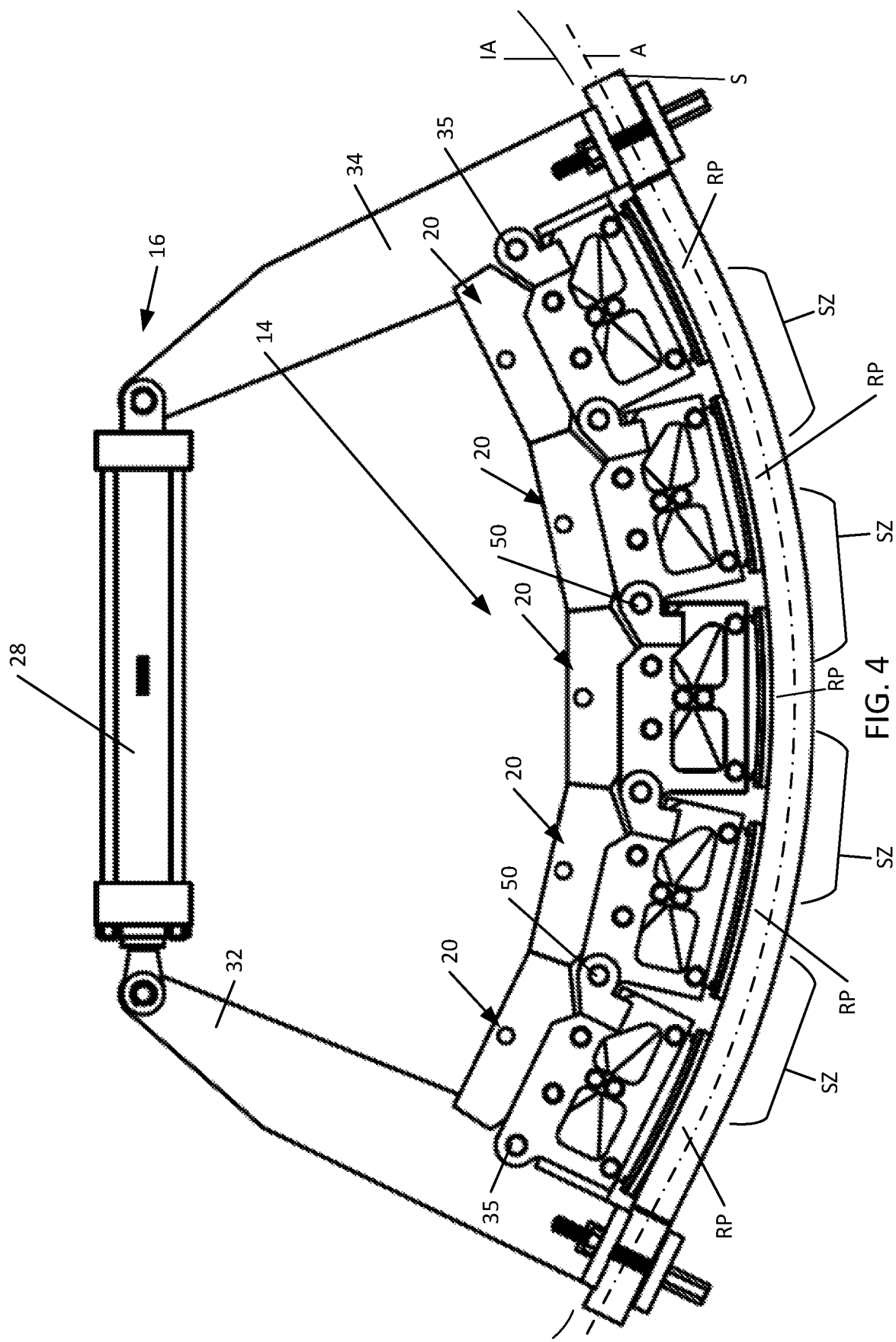
FIG. 4 is a top plan view of the subassembly of FIG. 2 in the position of FIG. 1.

Referring to FIGS. 2-4, in the illustrated embodiment, the drive mechanism 16 uses a single hydraulic cylinder 28 (broadly, a linear actuator, or more broadly still, a driver) to drive the entire linkage 14, e.g., to simultaneously drive movement of each individual chain link restraint 20. The illustrated drive mechanism 16 further comprises a first arm 32 and a second arm 34 on opposite ends of the hydraulic cylinder 28. Each arm 32 has a first end portion configured to couple to the specimen S as shown in the drawings and an opposite a second end portion that is pivotably connected to a respective end portion of the hydraulic cylinder 28. Each arm 32, 34 is pivotably connected to a respective one of the first and second end portions of the chain linkage 14 by a respective arm-to-chain pin 35 at a location along the arm spaced apart between the first and second end portions of the arm. In the illustrated embodiment, the first end portion of each arm 32, 34 comprises a specimen clamp 36. Each specimen clamp 36 is configured to clamp onto a respective end portion of the specimen S to constrain the respective end portion to move conjointly with the clamp when the hydraulic cylinder 28 moves the arms.

As explained above, the illustrated linkage 14 comprises a chain linkage, with each restraint 20 forming a pivoting link along the chain. The illustrated chain linkage 14 comprises five chain link restraints 20, which are configured to define four independent strain zones SZ along the specimen S. However, it will be understood that other chain linkages can comprise other numbers of restraints pivotably connected together end-to-end to form a chain. It is particularly contemplated, that chain linkages in the scope of this disclosure can comprise at least three restraints for defining at least two independent strain zones along the specimen. Accordingly, in certain embodiments, the chain linkage has from three to nine restraints. The chain linkage 14 has a first end portion (shown at left in FIGS. 1-4), a second end portion (shown at right in FIGS. 1-4), and a length extending from the first end portion to the second end portion. The chain linkage 14 also has a longitudinal forward facing side configured to oppose the elongate specimen S such that each chain link restraint 20 engages the specimen S at a respective line of contact on the longitudinal forward facing side of the chain linkage 20.

Referring to FIGS. 5-9, in the illustrated embodiment, each chain link restraint 20 comprises a substantially identical assembly. Each of the illustrated chain link restraints 20 comprises a chain link member 40, a specimen support 42 on a forward facing side of the chain link member, and an interchangeable stop member 44 on an inner side of the chain link member.

Figure 7:
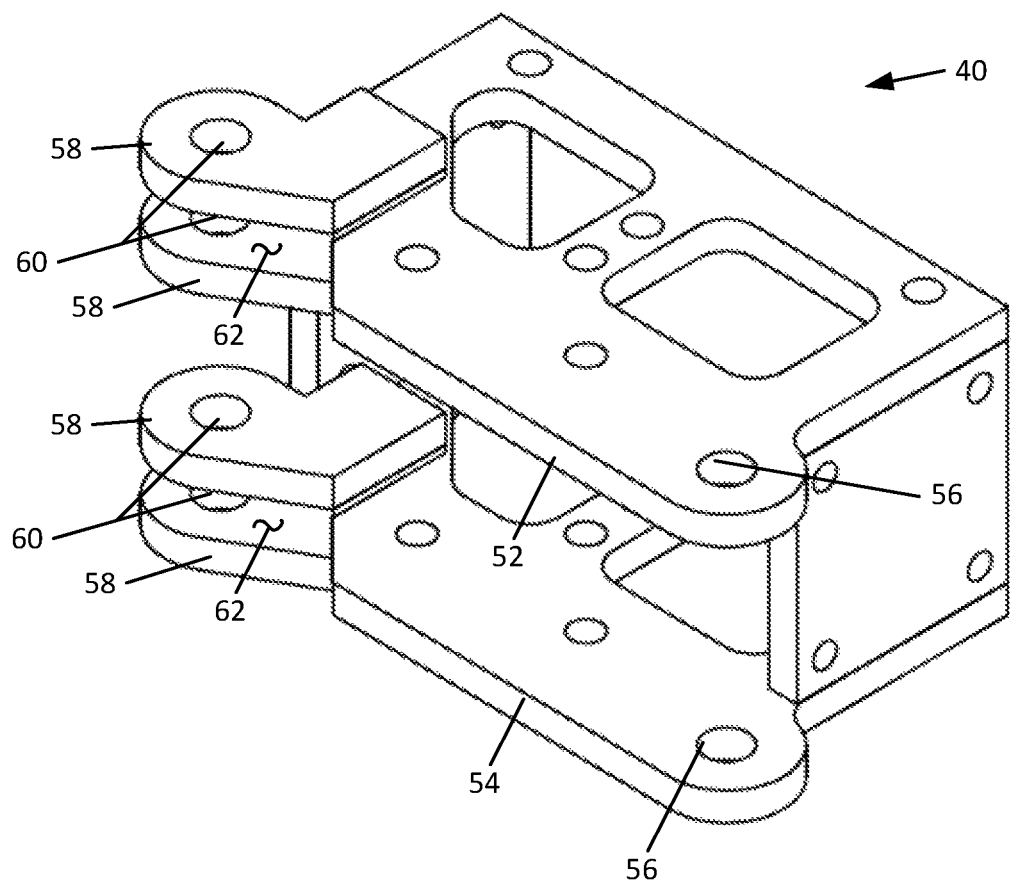
FIG. 7 is a perspective of a chain link member of the chain link restraint.

Each chain link member 40 comprises opposite first and second end portions spaced apart from one another in the lengthwise direction of the chain linkage 14. The chain link members 40 are configured so that the first end portion of one chain link member can be pivotably connected to the second end portion of an adjacent pin member by a chain pin 50 (FIGS. 2-4). Referring to FIG. 7, in the illustrated embodiment, the chain link member 40 comprises upper and lower plates 52, 54 that define upper and lower pin holes 56 centered a common pivot axis at the first end portion of the chain link member. The chain link member 40 further comprises a pair of offset plates 58 attached to the upper and lower surfaces of the second end portion of each of the upper and lower plates 52, 54. Each offset plate 58 extends proud of the edge of the respective one of the upper and lower plates 52, 54 and includes a pin hole 60. The pin holes 60 are aligned along another common pivot axis, and each pair of offset plates 58 is spaced apart heightwise to define a gap 62 between them. When the chain link members 40 are assembled together to form the chain linkage 14, the first end portion of each of the upper and lower plates 52, 54 is inserted into the respective gap 62 at the second end portion of an adjacent chain link member so that the pin holes 56 of the first chain link member align with the pin holes 60 of the latter chain link member. A chain link pin 50 (FIGS. 2-4) is installed in each set of aligned pin holes 56, 58 to pivotably couple the chain link members together as the chain linkage 14.

Referring briefly to FIGS. 2-4, in the illustrated embodiment, the first arm 32 is configured so that the arm-to-chain pin 35 is received in the pin holes 56 of the chain link member 40 that forms the first end portion of the chain linkage 14. Likewise, the second arm 34 is configured so that the arm-to-chain pin 35 is received in the pin holes 58 of the chain link member 40 that forms the second end portion of the chain linkage 14.

Figure 5:
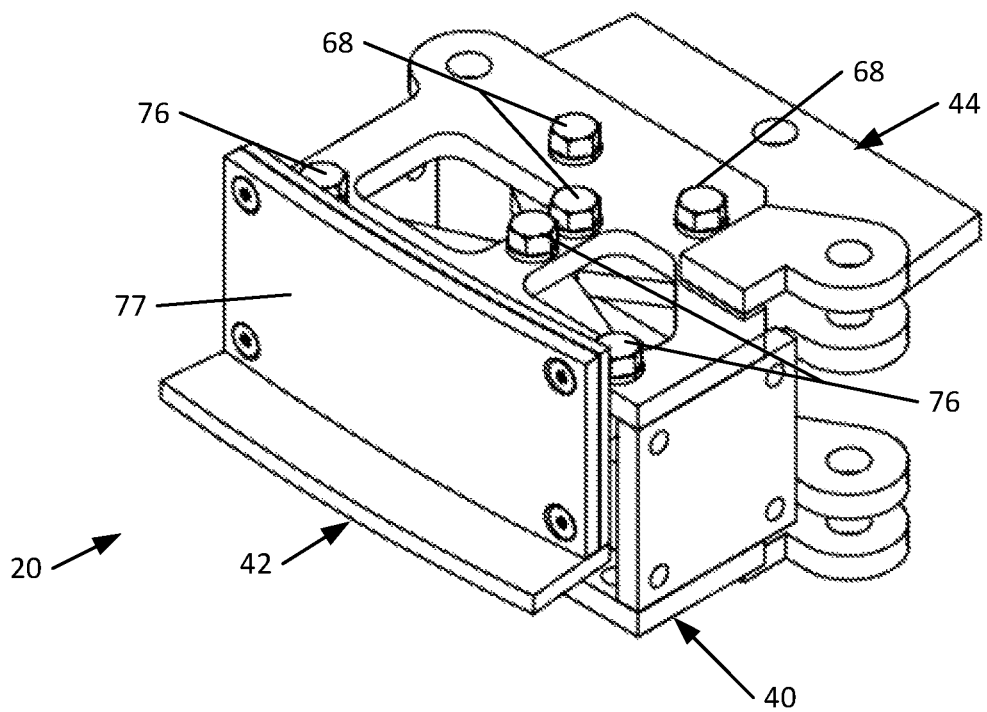
FIG. 5 is a perspective of a chain link restraint of the strain testing rig.
Figure 6:
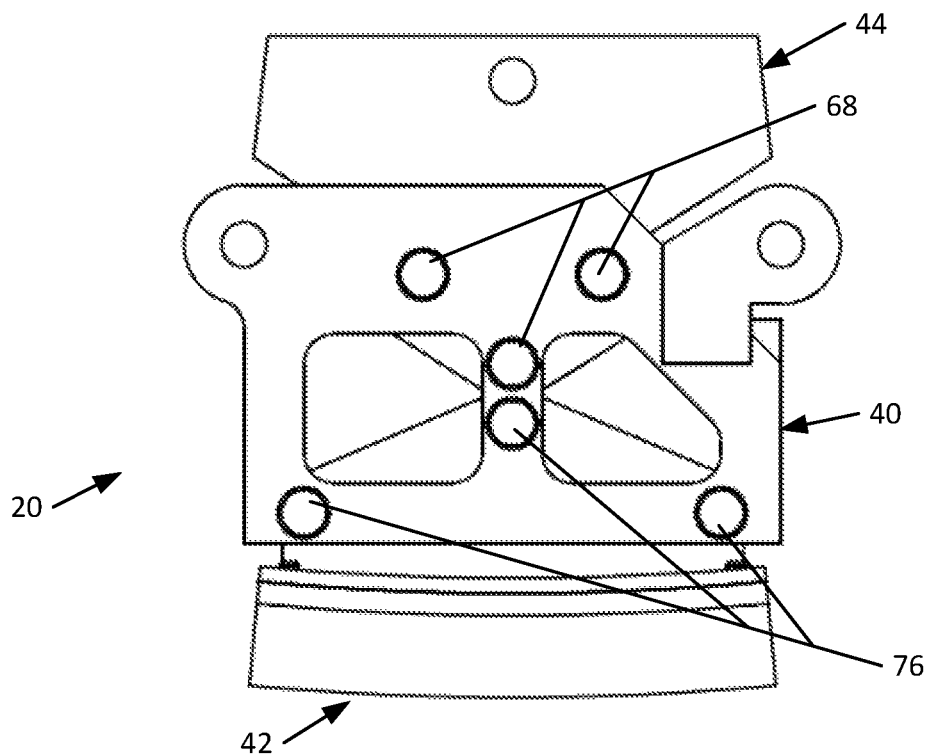
FIG. 6 is a top plan view of the chain link restraint.
Figure 8:
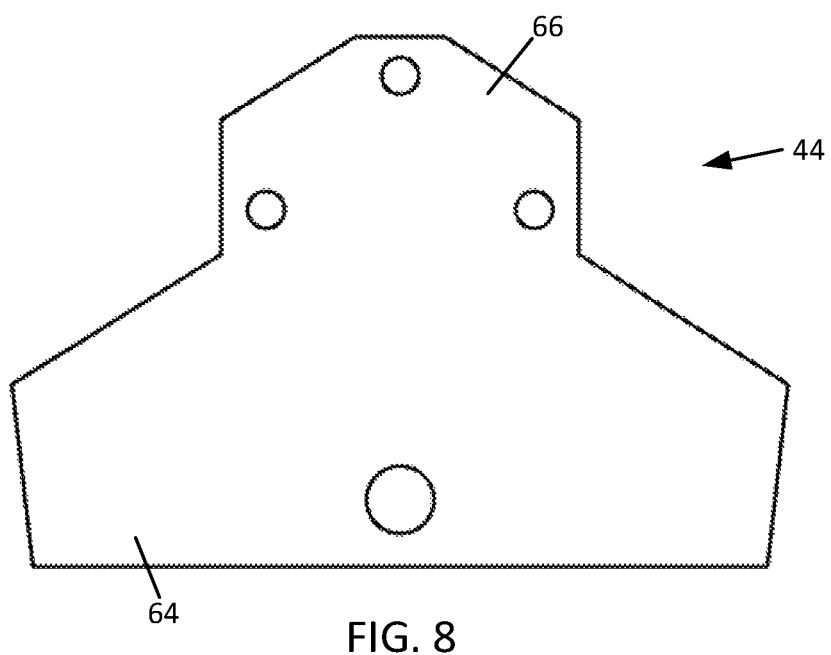
FIG. 8 is a top plan view of a stop member of the chain link restraint.

Referring to FIG. 8, in the illustrated embodiment, the stop member 44 comprises an elongate distal end portion 64 and a relatively short proximal end portion 66. The distal end portion 64 and the proximal end portion 66 each have a length in the lengthwise direction of the chain linkage 14, and the length of the distal end portion is greater than the length of the proximal end portion. In the illustrated embodiment, the proximal end portion 66 forms a tab-like projection from a middle region of the distal end portion. As shown in FIGS. 5 and 6, the proximal end portion 66 of the stop member is configured to be releasably fastened to the upper plate 52 of the chain link member 40 (e.g., using removable fasteners such as bolts 68). The distal end portion 64 of the stop member 44 projects from the hinged side of the chain link members. Opposite first and second edges of the distal end portion 64, which are spaced apart in the lengthwise direction of the chain linkage 14, are configured to form stops that engage the edges of the distal end portion of the adjacent stop members 44 to define an end position of the range of motion of the linkage (see FIGS. 1 and 4). The stop members 44 can be selectively replaced by other stop members of different sizes or shapes to make selected adjustments to the shape of the linkage 14 (e.g., to change the radius of curvature of the linkage) at the end position of its range of motion.

Figure 9:
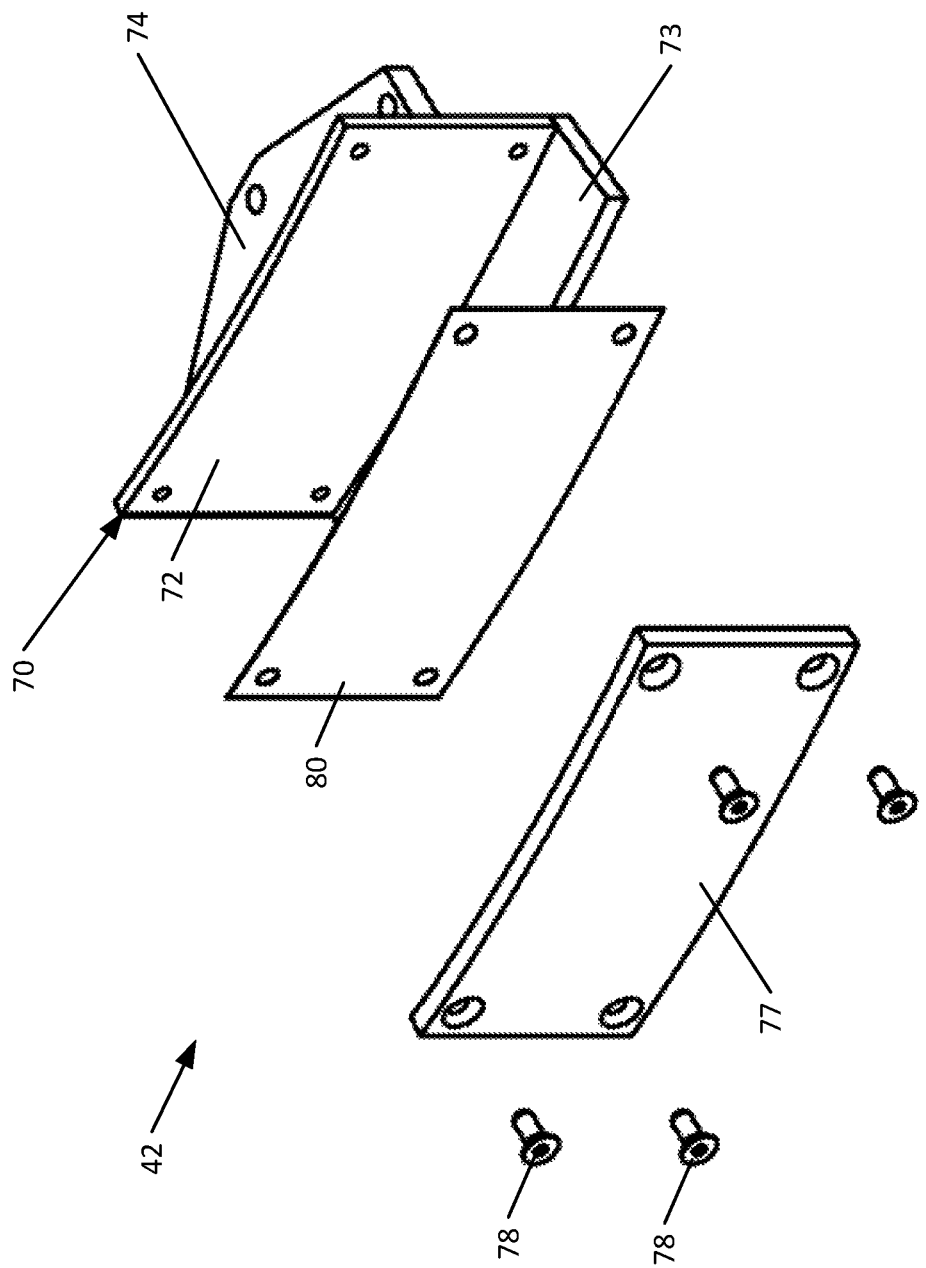
FIG. 9 is an exploded perspective of a specimen support of the chain link restraint.

Referring to FIG. 9, the illustrated specimen support 42 comprises a support bracket 70 that includes an upright press plate 72 and a lower support lip 73 that together form a generally L-shaped bracket. The support bracket 70 further comprises a mounting tab 74 that extends rearward from the press plate 72 on an opposite side as the support lip 72. The mounting tab 74 is configured to be releasably fastened to the upper plate 52 of the chain link member 40 (e.g., using removable fasteners such as bolts 76, as shown in FIGS. 5 and 6) to mount the specimen support 42 on the chain link member. The specimen support 42 further comprises a gripping pad 77 formed from resiliently compressible material. In the illustrated embodiment, the gripping pad 77 is secured to the upright press plate 72 via a set of attachment screws 78 and a strip of contact adhesive 80. When secured on the support bracket 70, the forward facing surface of the gripping pad 77 has a generally arcuate, convex shape. In this embodiment, the convex shape is achieved by forming the upright press plate 72 to be arcuate and conforming a flat strip of resiliently compressible material 76 to the arcuate press plate to form the gripping pad. As shown in FIGS. 1-4, the chain linkage 14 is configured to support the middle portion of the specimen S that extends between the clamps 36 such that the specimen rests on the lower support lips 73 and the middle portion of each gripping pad 77 defines the line of contact between the specimen and each respective chain link restraint 20.

Referring to FIGS. 3 and 4, having described the individual parts of the strain testing rig 10, the motion of the various parts of the rig, operating together, will now be briefly described. In general, the hydraulic cylinder 28 is configured to contract lengthwise from an extended position (FIG. 3) to a contracted position (FIG. 4). When the hydraulic cylinder 28 contracts, the centermost chain link restraint 20 remains fixed in in place with respect to the base and the remainder of the linkage 14 and the drive mechanism 16 move as constrained by the various connections in the linkage. In the extended position of the hydraulic cylinder 28, the arms 32, 34 are positioned to hold the chain linkage 14 in a straight configuration. For example, in the illustrated embodiment, the lines of contact between the chain linkage 14 and the specimen S are spaced apart along an imaginary line IL as shown in FIG. 3. When the hydraulic cylinder 28 contracts, the arms 32, 34 pivot about the arm-to-chain pins 35 such that the specimen clamps 36 rotate away from one another. Simultaneously, the arm-to-chain pins 35 move generally inward and rearward. This causes the forward facing longitudinal side of the chain linkage 14 that opposes the specimen S to adjust from straight to convexly curved. As may be understood by comparing FIGS. 3 and 4, the chain linkage 14 becomes progressively more curved as the cylinder 28 contracts. The lines of contact between the chain linkage 14 and the specimen S shift from being spaced apart along the imaginary line IL (FIG. 3) toward being spaced apart along an imaginary arc IA (FIG. 4). Eventually, the adjacent edges of the stop plates 44 engage one another to limit further movement of the linkage.

As can be seen, contraction of the hydraulic cylinder 28 causes the length along the axis A of the specimen S between the specimen clamp 36 of the first arm 32 and the specimen clamp of the second arm 34 to increase. And in addition, contraction of the hydraulic cylinder causes the chain linkage 14 to adjust from the straight configuration (FIG. 3) to the curved configuration (FIG. 4). This imparts tension on the specimen S that stretches the specimen along the axis A, while simultaneously bending the specimen. Contracting the hydraulic cylinder 28 also simultaneously forces each of the chain link restraints 20 outward against the specimen S as the forward facing side of the chain linkage 14 becomes progressively more convex. This causes a certain amount of bending of the specimen S, but the bending is a secondary effect. In that regard, the strain testing rig 10 is configured so that, when the drive mechanism moves the chain linkage 14 to simultaneously bend and stretch the specimen S, a greater portion of total deformation is attributable to stretching than bending.

The primary effect of making the chain linkage 14 progressively more convex, and thereby pressing each individual chain link restraint 20 against the specimen S, is to constrain each restrained portion RP of the specimen to move conjointly with the respective chain link restraint 20. In other words, the portion (e.g., set of particles) of the specimen S that make contact with the middle portion of each gripping pad 77 is substantially constant throughout the entire range of motion of the linkage 14. Thus, in the illustrated embodiment, the friction between each gripping pad 77 and the corresponding restrained portion RP of the specimen is sufficiently high to prevent slippage. And in instances when slippage is possible (e.g., the specimen has a very low coefficient of friction), each restrained portion RP of the specimen can be clamped to the upright press plate 72 of the chain link restraint 20 using a simple C-clamp to prevent slippage and constrain each restrained portion to move conjointly with the respective chain link restraint 20.

As can be seen by comparing FIGS. 3 and 4, by constraining each restrained portion RP of the specimen to move conjointly with the respective chain link restraint 20, the strain testing rig 10 individually tensions and bends each independent strain zone SZ. Thus, the drive mechanism 16 is configured to move each chain link restraint 20 to individually stretch each of the plurality of independent strain zones SZ of the specimen S along the axis A as the chain linkage 14 moves from the first position to the second position. In the illustrated embodiment, the testing rig 10 is configured to impart substantially uniform forces on each of the independent strain zones SZ. For instance, the drive mechanism 16 is configured to move the chain link restraints 20 to increase the length of each independent strain zone by about the same amount and at about the same rate. The drive mechanism 16 is also configured to move each of the chain link restraints 20 to simultaneously bend and stretch each independent strain zone SZ. But, as mentioned above, the strain testing rig 10 is configured so that, when the drive mechanism 16 moves the chain linkage 14 to simultaneously bend and stretch each independent strain zone, a greater portion of a total deformation of each independent strain zone SZ is attributable to stretching (elongation along the axis A) than bending.

In an exemplary method of using strain rig 10, an elongate specimen S of a material of interest is provided. Depending on what the desired strain characteristics of the material are, the interchangeable stop members 44 can be replaced with stop members of other sizes corresponding to different final curvatures of the linkage 14. The specimen S is positioned on the testing rig 10 with each opposite end portion secured by a respective clamp 36. In the supported position, the middle portion of the specimen S rests on the underlying support lips 73 of the chain linkage 14 and the forward facing surfaces of the gripping pads 76 are engaged with the opposing longitudinal surface of the specimen S at corresponding restrained portions RP of the specimen. If desired, strain gauges can be attached to the specimen S at one or more locations along each of the independent strain zones SZ. In certain embodiments, a suitable camera-based system for detecting one or more characteristics of the deformation of each of the independent strain zones SZ is set up to monitor the deformation of the specimen S. In one or more embodiments, sensors are also used to monitor the performance of the hydraulic cylinder 28. For example, a linear transducer can be used to detect the stroke of the cylinder and/or a force or pressure sensor can be used to detect the amount of force that the cylinder is using to contract. It is contemplated that any instrumentation or camera-based monitoring system for detecting one or more physical properties of the specimen S as it is deformed by the testing rig 10 and/or which provides information about the forces being imparted on the specimen can be used during testing without departing from the scope of the disclosure.

Subsequently, the hydraulic cylinder 28 is contracted. As explained above, the individual chain link restraints 20 press outward against the corresponding restrained portions RP and thereby constrain the restrained portions to move conjointly with them. Meanwhile, as the forward facing longitudinal side of the chain linkage 14 becomes progressively more convex, the chain link restraints 20 cause the independent strain zones SZ located between them to simultaneously bend and stretch along the axis A. The hydraulic cylinder 28 continues to contract until the edges of the stop members 44 engage one another to stop further movement of the linkage. During and/or upon completion of the hydraulic actuation, the strain effects on each independent strain zone SZ can be evaluated separately (e.g., based on the outputs of the strain gauges, camera-based monitoring systems, sensors associated with the hydraulic cylinder 28, etc.). Based on these assessments, it is believed to be possible to make a more reliable predictive assessment of the suitability of the specimen material for use as pipe insulation for pipes used in certain offshore reeling operations.

In another method of using the strain rig 10, the one-piece specimen S described above can be replaced by a composite specimen to simulate the laminated layers of an insulated pipe used in the field. For instance, a specimen may be provided with a thin strip of metal or metal conduit, coated with a fusion bonded epoxy and a further layer of an insulation material of interest. Testing this type of composite specimen in the strain rig 10 can provide an indication of how well the lamination of the different materials will withstand the reeling process. Depending on the thickness of the metal layer used in the composite specimen, the drive mechanism 16 or linkage 14 might need to be resized to facilitate bending the now-stiffer specimen.

In some cases, it might be desirable to simulate the twisting of pipe about the longitudinal axis that can occur during reeling operations, which creates an additional torsional load on the insulation material. The inventor contemplates that the strain testing rig 10 can be used to simulate twisting, along with stretching and bending, by providing a set of change parts for interchangeably replacing the linkage 14 and the arms 32, 34. The linkage formed by the change parts would be similar to the linkage 14, except that the chain link restraints and arms would be configured so that the axes of the chain pins and arm-to-chain pins are non-parallel and cause the chain link restraints outboard of the fixed center restraint to rotate in twist as the cylinder drives the linkage through its range of motion.

Accordingly, the inventors believe that the illustrated strain rig 10 enables commercially viable laboratory testing of material specimens for purposes of evaluating the suitability of specimen materials for reeling operations. Instead of concentrating the strain on small ISO or ASTM sized-specimen and thereby isolating the strain within a controlled region, the strain rig 10 takes a much longer specimen and constrains it to force the strain to occur somewhat evenly within independent strain zones SZ spaced apart along the length. This simulates to effect of the steel pipe that will underlie the insulation in the field, and moreover, provides more robust predictive information about how a greater length of material will behave when stretched (and, to a lesser extent, bent) in a reeling operation. Moreover, the proposed rig 10 is laboratory-scaled in that it can fit inside and used within a conventional laboratory space for such equipment (e.g., a room section with a footprint of less than 400 square feet and a height of less than ten feet).

Although the above-described strain testing rig 10 is designed specifically for laboratory-scale testing of specimens S, it is contemplated that a much larger version of the testing rig 10 could be made for performing similar tests of full-scale insulated pipe specimens or other types of very large specimens. Such a full scale testing rig would generally comprise at least three movable restraints for engaging the full-scale specimen at respective points of contact spaced apart along the longitudinal axis of the specimen and a drive mechanism configured to move the restraints to stretch independent strain zones of the specimen between the points of contact so that the length of each independent strain zone increases. For instance, a strain rig could be assembled comprising a chain linkage with much larger chain link restraints than the linkage 14 shown above and/or a chain linkage comprising a greater number of chain link restraints pivotably connected end-to-end to extend along the greater length of a full-scale specimen. As compared with the prior art full-scale testing rig described above in the background section, the novel full-scale testing rig disclosed here would advantageously constrain the full-scale specimen so that discrete independent strain zones of the specimen are deformed simultaneously and independently of the strain in the other strain zones. As explained above, this is thought to provide more robust information about the characteristics of the specimen and its usefulness for reeling operations.

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the disclosure are achieved and other advantageous results attained.

As various changes could be made in the above products and methods without departing from the scope of the disclosure, it is intended that all matter contained in the above description shall be interpreted as illustrative and not in a limiting sense.

What is claimed is:

1. A strain testing rig for testing an elongate specimen having a first end portion and a second end portion spaced apart along a linear axis, the strain testing rig comprising:
   at least three restraints arranged to be spaced apart along the linear axis intersecting said at least three restraints, each of the restraints being configured to engage the elongate specimen at a respective contact location such that the strain testing rig defines an independent strain zone between each pair of adjacent contact locations, each independent strain zone having a length along the axis; and a drive mechanism configured to move the at least three restraints between a first position in which adjacent ones of the restraints are spaced apart a first distance along the linear axis intersecting said at least three restraints and a second position in which adjacent ones of the restraints are spaced apart a second distance greater than the first distance along the linear axis intersecting said at least three restraints to stretch each independent strain zone such that the length of each independent strain zone along the axis increases.

2. The strain testing rig as set forth in claim 1, wherein the drive mechanism is configured to move the at least three restraints simultaneously to increase the length of each independent strain zone.

3. The strain testing rig as set forth in claim 1, wherein the drive mechanism is configured to move the at least three restraints simultaneously to increase the length of each independent strain zone at the same rate.

4. The strain testing rig as set forth in claim 1, wherein the drive mechanism is configured to move the at least three restraints to bend each of the independent strain zones.

5. The strain testing rig as set forth in claim 4, wherein the drive mechanism is configured to move the at least three restraints to simultaneously bend and stretch each independent strain zone.

6. The strain testing rig as set forth in claim 5, wherein the strain testing rig is configured so that, when the drive mechanism moves the at least three restraints to simultaneously bend and stretch each independent strain zone, a greater portion of a total deformation of each independent strain zone is attributable to stretching than bending.

7. The strain testing rig as set forth in claim 1, wherein the at least three restraints are connected together to form a linkage and the drive mechanism comprises a driver configured to drive the linkage through a range of motion.

8. The strain testing rig as set forth in claim 7, wherein the range of motion includes a first position at which the linkage is positioned so that the contact locations are spaced apart along a line and a second position at which the linkage is positioned so that the restraints are spaced apart along an arc.

9. The strain testing rig as set forth in claim 7, wherein the driver is a single driver connected to the linkage for simultaneously moving each of the at least three restraints.

10. The strain testing rig as set forth in claim 1, wherein the at least three restraints comprise at least five restraints.

11. The strain testing rig as set forth in claim 1, wherein each restraint is configured to restrain a restrained portion of the specimen at the respective contact location such that the restrained portion of the specimen moves conjointly with the restraint when the drive mechanism moves the restraints to stretch each of the independent strain zones.

12. The strain testing rig as set forth in claim 1, wherein testing rig is configured to repeatably test elongate specimens having lengths in an inclusive range of from 3 feet to 4 feet.

13. The strain testing rig as set forth in claim 1 wherein the restraints are pivotably interconnected.

14. A strain testing rig as set forth in claim 1 wherein at least one of the restraints comprises a surface arranged to engage the elongate specimen, the surface being arcuate in shape.

15. A strain testing rig for testing an elongate specimen having a first end portion and a second end portion spaced apart along an axis, the strain testing rig comprising:

at least three restraints arranged to be spaced apart along the axis of the elongate specimen, each of the restraints being configured to engage the elongate specimen at a respective contact location such that the strain testing rig defines an independent strain zone between each pair of adjacent contact locations, each independent strain zone having a length along the axis; and a drive mechanism configured to move the at least three restraints to stretch each independent strain zone such that the length of each independent strain zone along the axis increases:

wherein each restraint comprises a chain link member, the chain link members being pivotably connected end-to-end to form a chain linkage having a first end portion and a second end portion.

16. The strain testing rig as set forth in claim 15, wherein the drive mechanism comprises:

a linear actuator having a first end portion and a second end portion, a first arm having a first end portion and second end portion pivotably connected to the first end portion of the linear actuator, and a second arm having a first end portion and a second end portion pivotably connected to the second end portion of the linear actuator, the first end portion of the chain linkage being pivotably connected to the first arm at a location spaced apart from the second end portion of the first arm toward the first end portion of the first arm, the second end portion of the chain linkage being pivotably connected to the second arm at a location spaced apart from the second end portion of the second arm toward the first end portion of the second arm.

17. The strain testing rig as set forth in claim 16, wherein the first end portion of the first arm is configured to be fixedly attached to the first end portion of the specimen and the first end portion of the second arm is configured to be fixedly attached to the second end portion of the specimen.

18. The strain testing rig as set forth in claim 17, wherein the linear actuator is configured to contract to adjust the chain linkage from a straight configuration to a curved configuration.

19. The strain testing rig as set forth in claim 18, wherein the chain linkage is configured to deform the specimen so that the axis adjusts from straight to generally curved as the linear actuator adjusts the chain linkage from the straight configuration to the curved configuration.

20. The strain testing rig as set forth in claim 19, wherein a length along the axis between the first end portion of the first arm and a first end portion of the second arm increases as the linear actuator adjusts the chain linkage from the straight configuration to the curved configuration.

21. The strain testing rig as set forth in claim 15, wherein each restraint further comprises a gripping pad on the chain link member configured to contact the specimen, the gripping pad being formed from resiliently compressible material and having a convex forward facing surface.

22. A method of strain testing an elongate specimen, the method comprising:

engaging a plurality of restraints with the elongate specimen at respective contact locations spaced apart along a length of the elongate specimen;

moving each of the plurality of restraints to simultaneously increase a distance between adjacent restraints measured along a fixed linear axis intersecting the restraints thereby to increase a length of at least two independent strain zones, each independent strain zone being located between an adjacent pair of contact locations.

23. A strain testing rig for testing an elongate specimen having a first end portion and a second end portion spaced apart along an axis, the strain testing rig comprising:

a base;

a chain linkage supported on the base, the chain linkage comprising a plurality of chain link restraints pivotably connected end-to-end, the chain linkage having a first end portion, a second end portion, and a length extending from the first end portion to the second end portion, the chain linkage having a longitudinal forward facing side configured to oppose the elongate specimen such that, on the longitudinal forward facing side of the chain linkage, each chain link restraint engages the specimen at a respective location along the axis; and a driver connected to the chain linkage for driving the chain linkage through a range of motion with respect to the base, the range of motion including a first position in which the forward facing side of the chain linkage is substantially straight and a second position in which the forward facing side of the chain linkage is convexly curved.

24. The strain testing rig as set forth in claim 23, wherein each chain link restraint is configured to restrain a respective restrained portion of the specimen at the respective location along the axis such that each restrained portion moves conjointly with the respective chain link restraint as the driver moves the chain linkage from the first position to the second position.

25. The strain testing rig as set forth in claim 24, wherein the chain linkage is configured to simultaneously stretch a plurality of independent strain zones of the specimen along the axis as the driver moves the chain linkage from the first position to the second position, wherein each independent strain zone extends along the axis between a respective adjacent pair of restrained portions.

* * * * *